United States Patent
Walters et al.

(10) Patent No.: US 11,797,888 B2
(45) Date of Patent: Oct. 24, 2023

(54) SYSTEM AND METHOD FOR AUTOMATICALLY RETRAINING MACHINE LEARNING MODELS TO PREDICT BIAS IN A DATA INPUT

(71) Applicant: Capital One Services, LLC, McLean, VA (US)

(72) Inventors: Austin Walters, Savoy, IL (US); Mark Watson, Urbana, IL (US); Jeremy Goodsitt, Champaign, IL (US); Anh Truong, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 151 days.

(21) Appl. No.: 17/366,554

(22) Filed: Jul. 2, 2021

(65) Prior Publication Data
US 2021/0334707 A1 Oct. 28, 2021

Related U.S. Application Data

(63) Continuation of application No. 16/731,575, filed on Dec. 31, 2019, now Pat. No. 11,062,234.

(51) Int. Cl.
*G06N 20/00* (2019.01)
*G06F 16/28* (2019.01)
*G06N 7/01* (2023.01)

(52) U.S. Cl.
CPC .......... *G06N 20/00* (2019.01); *G06F 16/285* (2019.01); *G06N 7/01* (2023.01)

(58) Field of Classification Search
CPC .................................................. G06N 20/00
See application file for complete search history.

(56) References Cited

U.S. PATENT DOCUMENTS

| 2015/0371191 A1 | 12/2015 | Taylor et al. |
| 2018/0349796 A1* | 12/2018 | Gibbs ................ H04L 63/104 |
| 2019/0102682 A1 | 4/2019 | Jayaraman et al. |
| 2019/0147371 A1 | 5/2019 | Deo et al. |

(Continued)

OTHER PUBLICATIONS

Wang et al., "A Framework for QoS-aware Traffic Classification using Semi-Supervised Machine Learning in SDNs", 2016 (Year: 2016).*

(Continued)

*Primary Examiner* — Selene A. Haedi
(74) *Attorney, Agent, or Firm* — Greenberg Traurig, LLP

(57) ABSTRACT

A method includes receiving, by a processor, bias data categories. A data input from a user for classification in data categories is received. A classification machine learning model is utilized to classify the data input in at least one data category and determine a first confidence probability in a classification outcome. A bias filter machine learning model is utilized to determine a second confidence probability that the classification outcome of classifying the data input into the at least one data category is based on at least one bias characteristic associated with at least one bias data category. A gate machine learning model is utilized to determine when to output the classification outcome of classifying the data input into the at least one data category to a computing device of a user based at least in part on the first confidence probability, the second confidence probability, and a predefined bias threshold.

20 Claims, 10 Drawing Sheets

(56) References Cited

U.S. PATENT DOCUMENTS

2020/0058382 A1   2/2020  Birnbaum et al.
2020/0082299 A1   3/2020  Vasconcelos et al.
2020/0082300 A1*  3/2020  Farrar ...................... G06N 5/04
2021/0174222 A1*  6/2021  Dodwell ............... G06F 16/285

OTHER PUBLICATIONS

Vateekul et al., "A Study of Sentiment Analysis Using Deep Learning Techniques on Thai Twitter Data", 2016 (Year: 2016).*
Li et al., "Confidence-Based Active Learning", 2006 (Year: 2006).*
Zadrozny, "Learning and Evaluating Classifiers under Sample Selection Bias", 2004 (Year: 2004).*

* cited by examiner

SYSTEM AND METHOD FOR AUTOMATICALLY RETRAINING MACHINE LEARNING MODELS TO PREDICT BIAS IN A DATA INPUT

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-based systems and methods for managing classification outcomes of data inputs classified into bias categories.

BACKGROUND OF TECHNOLOGY

A computer network platform/system may include a group of computers (e.g., clients, servers, smart routers) and other computing hardware devices that are linked together through one or more communication channels to facilitate communication and/or resource-sharing, via one or more specifically programmed graphical user interfaces (GUIs) of the present disclosure, among a wide range of users.

SUMMARY OF DESCRIBED SUBJECT MATTER

In some embodiments, the present disclosure provides an exemplary technically improved computer-based method that includes at least the following steps of:
  receiving, by a processor, a plurality of bias data categories;
  receiving, by the processor, a data input from a user for classification in a plurality of data categories;
  utilizing, by the processor, a classification machine learning model to classify the data input in at least one data category from the plurality of data categories and determine a first confidence probability in a classification outcome;
  utilizing, by the processor, a bias filter machine learning model to determine a second confidence probability that the classification outcome of classifying the data input into the at least one data category from the plurality of data categories is based on at least one bias characteristic associated with at least one bias data category from the plurality of bias data categories;
  utilizing, by the processor, a gate machine learning model to determine when to output the classification outcome of classifying the data input into the at least one data category from the plurality of data categories to a computing device of a user based at least in part on:
  i) the first confidence probability,
  ii) the second confidence probability, and
  iii) a predefined bias threshold; and
  outputting, by the processor, the classification outcome of classifying the data input into the at least one data category from the plurality of data categories to the computing device of the user based on the determination of the gate machine learning model.

In some embodiments, the present disclosure provides an exemplary technically improved computer-based system that includes at least the following components of a system may include a memory and a processor. The processor may be configured to:
  receive a plurality of bias data categories;
  receive a data input from a user for classification in a plurality of data categories;
  utilize a classification machine learning model to classify the data input in at least one data category from the plurality of data categories and determine a first confidence probability in a classification outcome;
  utilize a bias filter machine learning model to determine a second confidence probability that the classification outcome of classifying the data input into the at least one data category from the plurality of data categories is based on at least one bias characteristic associated with at least one bias data category from the plurality of bias data categories;
  utilize a gate machine learning model to determine when to output the classification outcome of classifying the data input into the at least one data category from the plurality of data categories to a computing device of a user based at least in part on:
  i) the first confidence probability,
  ii) the second confidence probability, and
  iii) a predefined bias threshold; and
  output the classification outcome of classifying the data input into the at least one data category from the plurality of data categories to the computing device of the user based on the determination of the gate machine learning model.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
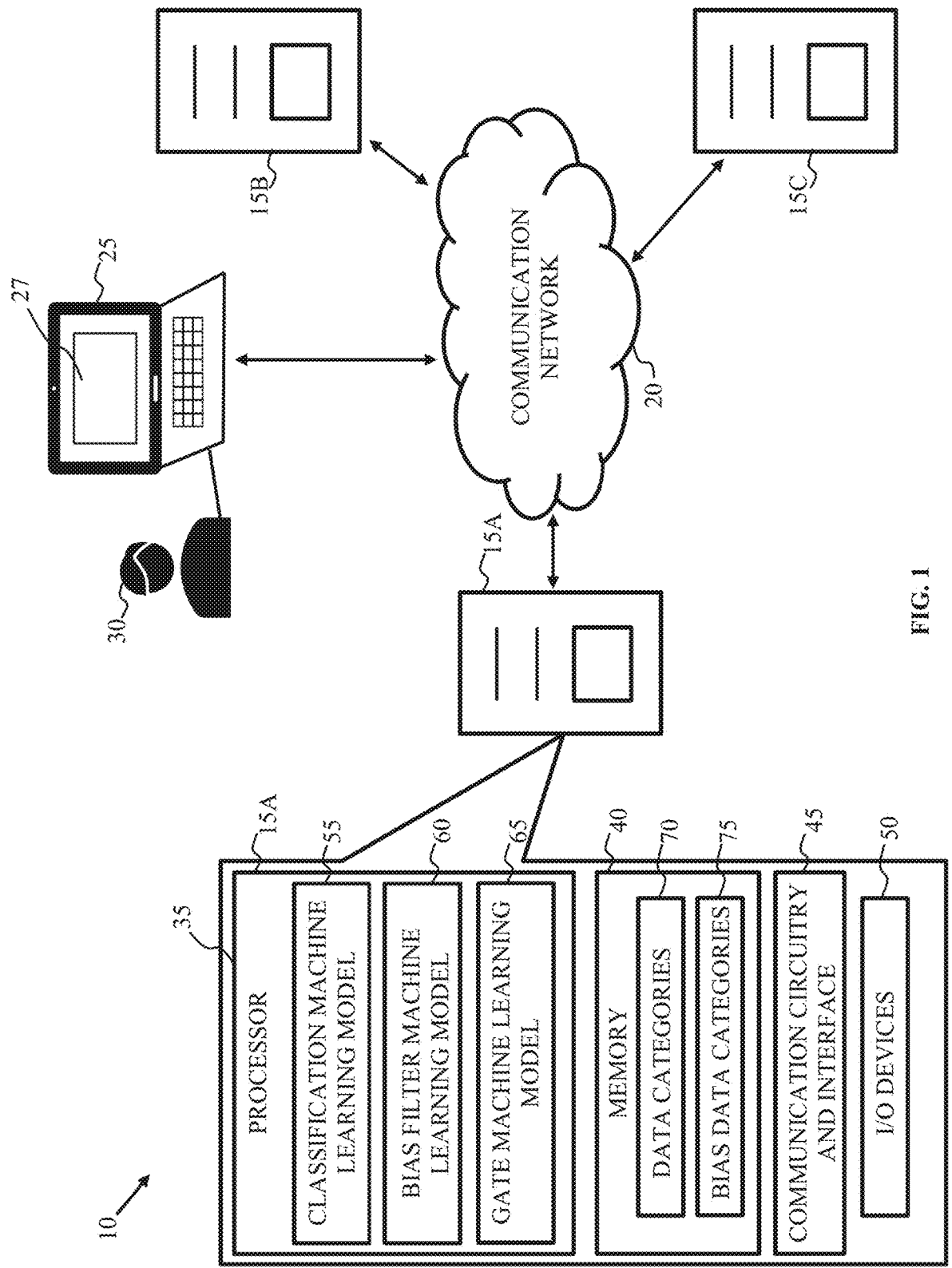
FIG. 1 depicts a first block diagram of an exemplary computer-based system for managing classification outcomes of data inputs classified into bias categories, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

Embodiments of the present disclosure teach methods and systems for managing classification outcomes of data inputs classified into bias categories. Classification machine learning models may be configured to receive a data input, such as image data of a picture, and classify what object, animate or inanimate, is displayed in the image data into classification categories. Similarly, the data input may include data of a voice recording where the classification machine learning algorithms may identify a person speaking or an accent of the person's voice in the voice recording. However, many times the classification machine learning algorithm may classify the data input incorrectly, which can be very problematic if there is an offensive misclassification, such as a human being classified as a gorilla, for example.

In some embodiments, a bias category may be defined at least in part on one or more biases associated with gender, race, skin color, shape of body part, mental abilities, physical abilities, place of origin, social affiliation, political affiliation, education level, for example.

In some embodiments, both the classification machine learning model and a bias filter machine learning model may receive the same data input. The bias filter machine learning model may be used to determine a probability that the data input may be classified into a category that may be biased. In the context of the present disclosure, a biased classification may be potentially offensive or may cause damage to people or an entity if the data input is misclassified and/or misinterpreted. The output of the classification machine learning model and the bias filter machine learning model may then be relayed to a gate machine learning model, which is configured to manage classification outcomes of the data inputs when classified into bias categories.

The exemplary embodiments shown hereinbelow solve the technical problem of misclassifying data inputs into bias data categories by the use of a gate machine learning model to manage bias classification outcomes either by blocking and/or warning users that the data input classifications may be biased.

FIG. 1 depicts a block diagram of an exemplary computer-based system 10 for managing classification outcomes of data inputs classified into bias categories, in accordance with one or more embodiments of the present disclosure. System 10 may include a plurality of computing devices 15, such as servers, denoted server 15A, server 15B, and server 15C, as well as a computer 25 including a display 27 of a user 30 all communicating over a communication network 20. Each of servers 15 as shown in the enlargement for server 15A may include a processor 35, a memory 40, communication circuitry and interface 45, and input/output (I/O) devices 50.

In some embodiments, processor 35 may be configured to execute code for software modules of a classification machine learning model 55, a bias filter machine learning model 60, and/or a gate machine learning model 65. Memory 40 may be configured to store a list of data categories 70 for use by classification machine learning model 55 and/or a list of bias data categories 75 for use by bias filter machine learning model 60.

Figure 2A:
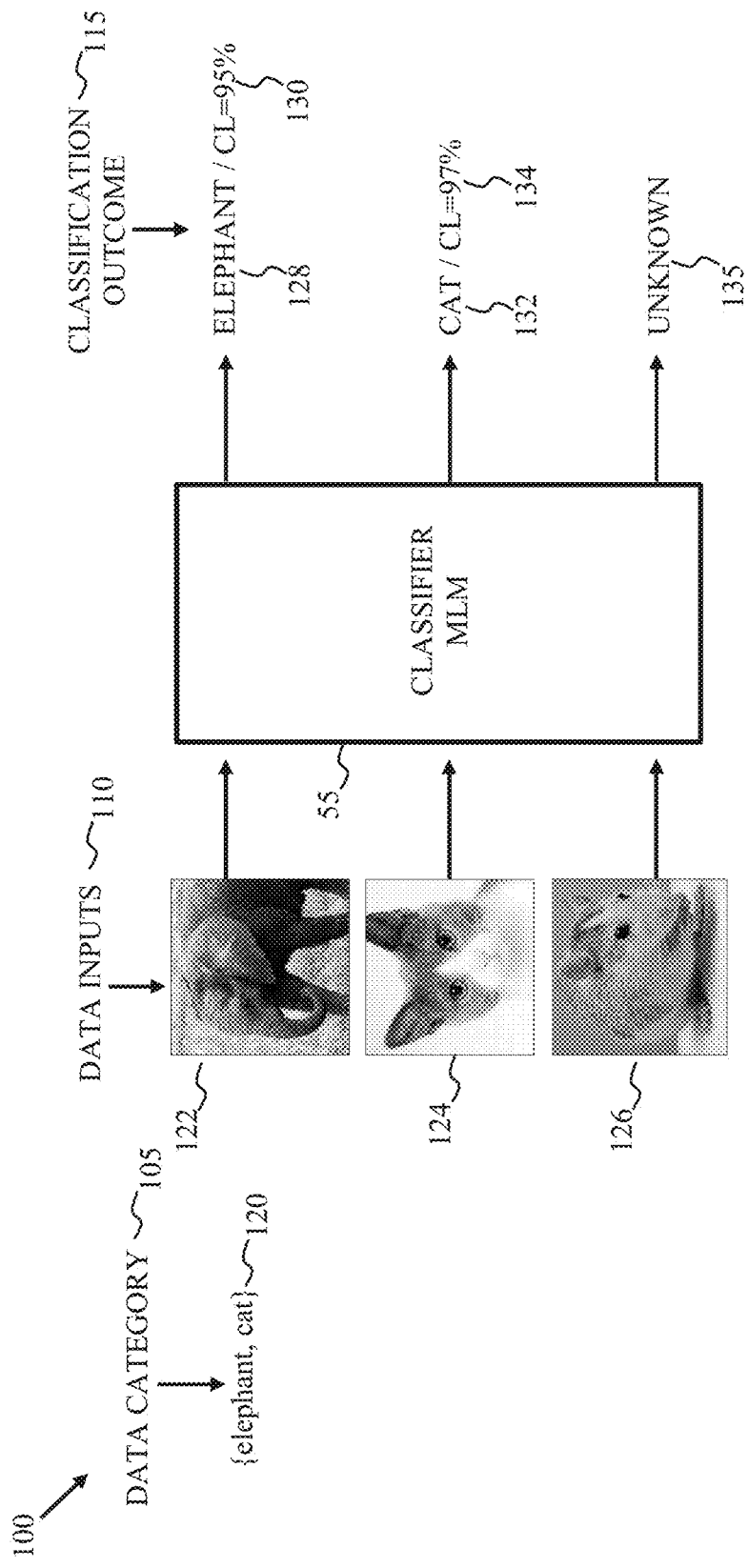
FIGS. 2A-2C depict exemplary embodiments of different data inputs and their classification outcomes, in accordance with one or more embodiments of the present disclosure.
Figure 2B:
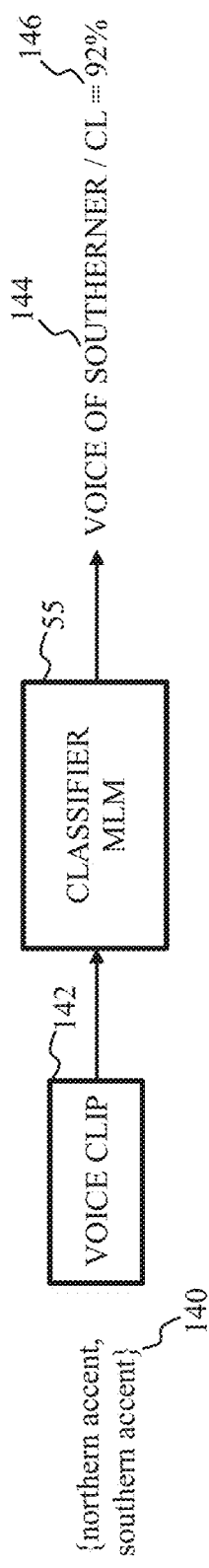
Figure 2C:
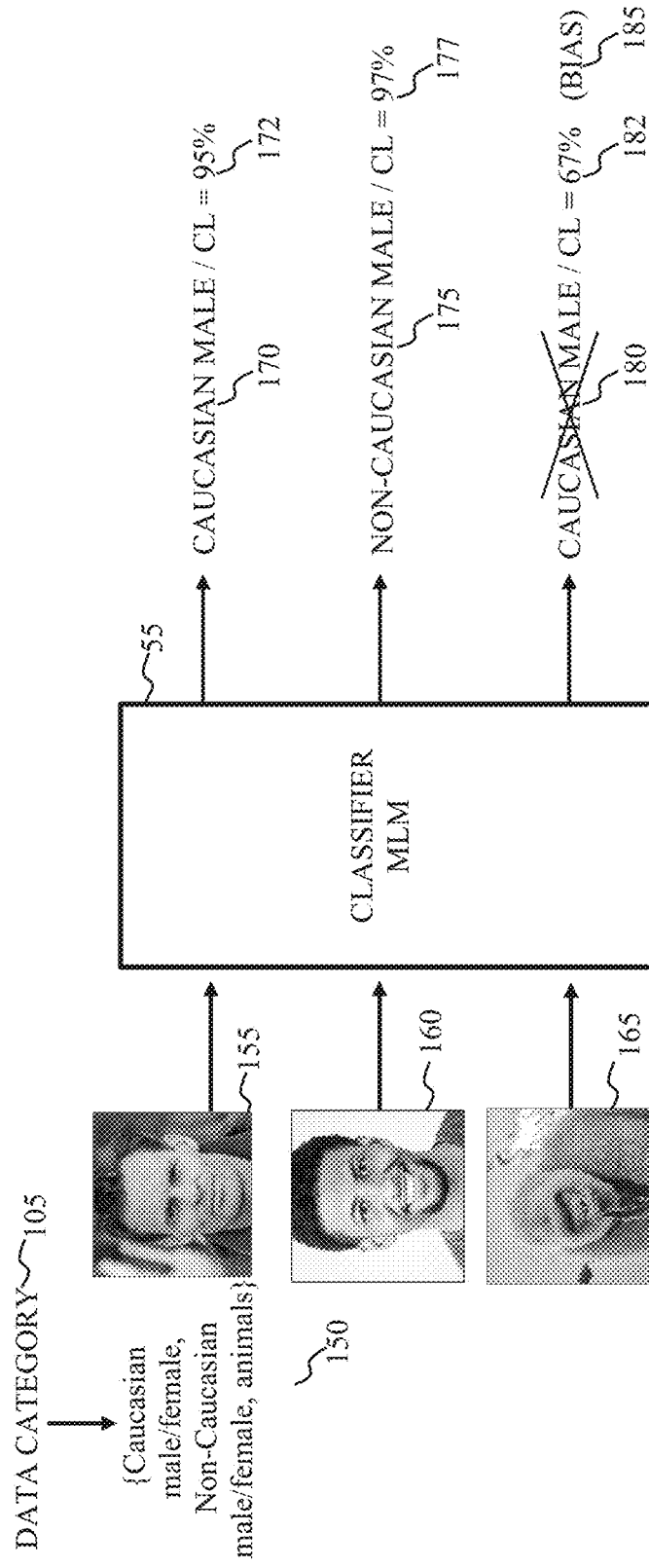

FIGS. 2A-2C depict exemplary embodiments 100 of different data inputs and their classification outcomes, in accordance with one or more embodiments of the present disclosure.

FIG. 2A depicts a first exemplary embodiment of image data inputs and their classification outcomes, in accordance with one or more embodiments of the present disclosure. Each exemplary embodiment depicts data categories 105 that data inputs 110 may be classified by classification machine learning model (MLM) 55. MLM 55 may output a classification outcome 115. For example, data categories 120 may be an elephant or a cat. For an image data input of an elephant 122, the classification outcome may be an "elephant" 128 with a confidence level 130 of 95%. For an image data input of a cat 124, the classification outcome may be a "cat" 132 with a confidence level 134 of 97%. For an image data input of a mouse 126, classifier MLM 55 may not determine classification outcome 115 so classifier MLM 55 may report an output 135 as "unknown".

FIG. 2B depicts a second exemplary embodiment of a data input of a voice clip 142 and their classification outcomes, in accordance with one or more embodiments of the present disclosure. Voice clip 142 may be in any suitable audio file input format such as an MPEG Audio Layer-3 (MP3), for example. Data categories 140 may include a "northern accent" or a "southern accent" for classifying the data input using classifier MLM 55, which may recognize a voice of a Southerner 144 in voice clip 142 with a confidence level 146 of 92%, for example.

FIG. 2C depicts a third exemplary embodiment of an image data input and their classification outcomes, in accordance with one or more embodiments of the present disclosure. Data categories 150 may be a Caucasian male or female, a Non-Caucasian male or female, and animals. For an image data input of a Caucasian male 155, the classification outcome may be a "Caucasian male" 170 with a confidence level 172 of 95%. For an image data input of an Non-Caucasian male 160, the classification outcome may be a "Non-Caucasian male" 175 with a confidence level 177 of 97%. For an image data input of a white gorilla 165, classifier MLM 55 may misclassify the image data and report "Caucasian Male" 180 with a lower confidence level 182 of 67%. This is a bias category 185.

Similarly, consider another exemplary scenario, for example, for a picture of four people—two of which are Non-Caucasian males and two of which are Caucasian males. The input image data of this picture is then relayed to classifier MLM 55. If classifier MLM 55 reports any of the four people in the picture as being a gorilla, this may be very offensive to the person classified as the gorilla. Accordingly, any of these data categories 150 may be bias categories when used to misclassify the input data. Thus, embodiments of the present disclosure may be used to manage the classification outcomes of data inputs classified into bias categories by classifier MLM 55.

Using the second exemplary embodiment described above, a southern accent may be a bias category in the following exemplary scenario. Suppose there is a catastrophic hurricane in the southern United States causing large financial losses in property damage. A person may call in the next day after the hurricane to a financial institution applying for a loan or an increase in a credit card line of credit on a credit card, for example. The telephone communication line may sample the voice of the applicant. The voice data sample may then be relayed as an input to classifier MLM 55 identifying the person as a southerner.

The agent of the financial institution and/or algorithms assessing whether the applicant may be qualified to receive a loan and/or an increase in a line of credit is biased. If the applicant is indeed a victim of the hurricane, the applicant may have severe financial losses from the hurricane and the financial institution may use this information in credit risk assessment. However, if the applicant is merely a southerner living in the Northern United States, then the financial institution may mistakenly assume that the applicant is under financial stress. The financial institution may deny the applicant as a credit risk merely based on the applicant's southern accent and applying for more credit (e.g., loan and/or increased credit card line) one day after the hurricane devastation, for example.

In a similar vein for determining creditworthiness of an applicant for credit in the same exemplary example above, classifier MLM 55 may use handwriting sample and/or e-mail document written by the applicant to classify the applicant as someone with higher education or lower education. For example, classifier MLM 55 may assess that the applicant writes like a lawyer or a janitor to determine creditworthiness. However, the applicant may be a janitor writing like a lawyer or a lawyer writing like a janitor so the assessed occupation of the applicant may be a bias category.

Figure 3:
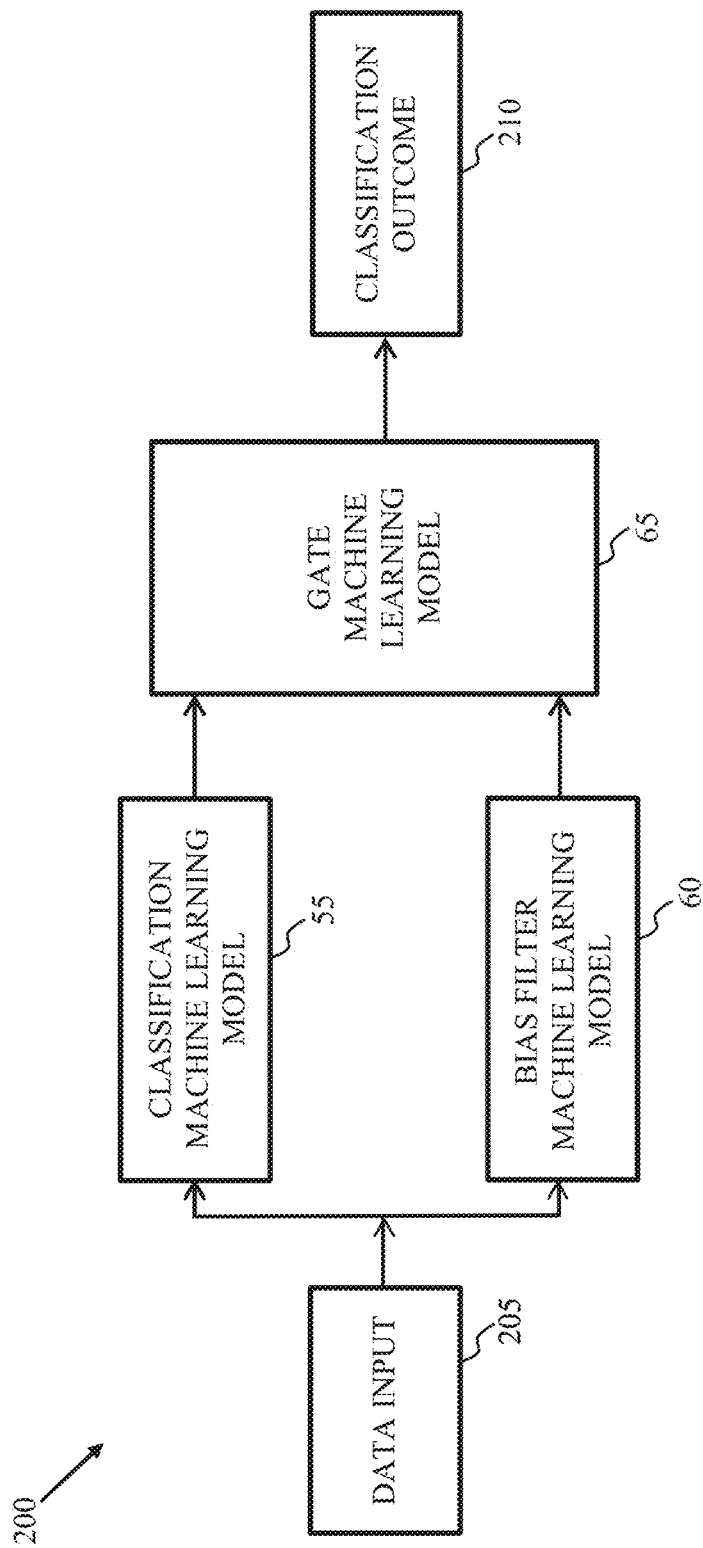
FIG. 3 depicts a second block diagram of an exemplary computer-based system for managing classification outcomes of data inputs classified into bias categories, in accordance with one or more embodiments of the present disclosure.

FIG. 3 depicts a second block diagram of an exemplary computer-based system 200 for managing classification outcomes of data inputs classified into bias categories, in accordance with one or more embodiments of the present disclosure. Processor 35 may perform the functions of system 200. Processor 35 may receive a data input 205 from user 30. Data input 205 may be a text file, an audio file, a video data file, and/or an image data file.

Processor 35 may relay data input 205 to the inputs of both classification machine learning model 55 and bias filter machine learning model 60. Classification machine learning model 55 may classify data input 205 in at least one data category from a plurality of data categories and may determine a first confidence probability (e.g. confidence level 172, confidence level 177, and/or confidence level 182) in a classification outcome.

Similarly, bias filter machine learning model 60 may determine a second confidence probability that the classification outcome of classifying the data input into the at least one data category from the plurality of data categories is based on at least one bias characteristic associated with at least one bias data category from the plurality of bias data categories.

The data input, at least one data category, the at least one bias data category, as well as the first and second confidence probabilities may be input to gate machine learning model 65 to determine how to manage a classification outcome 210 of classifying the data input into the at least one data category from the plurality of data categories to a computing device of a user based at least in part on the first confidence probability, the second confidence probability, and a pre-defined bias threshold.

Figure 4:
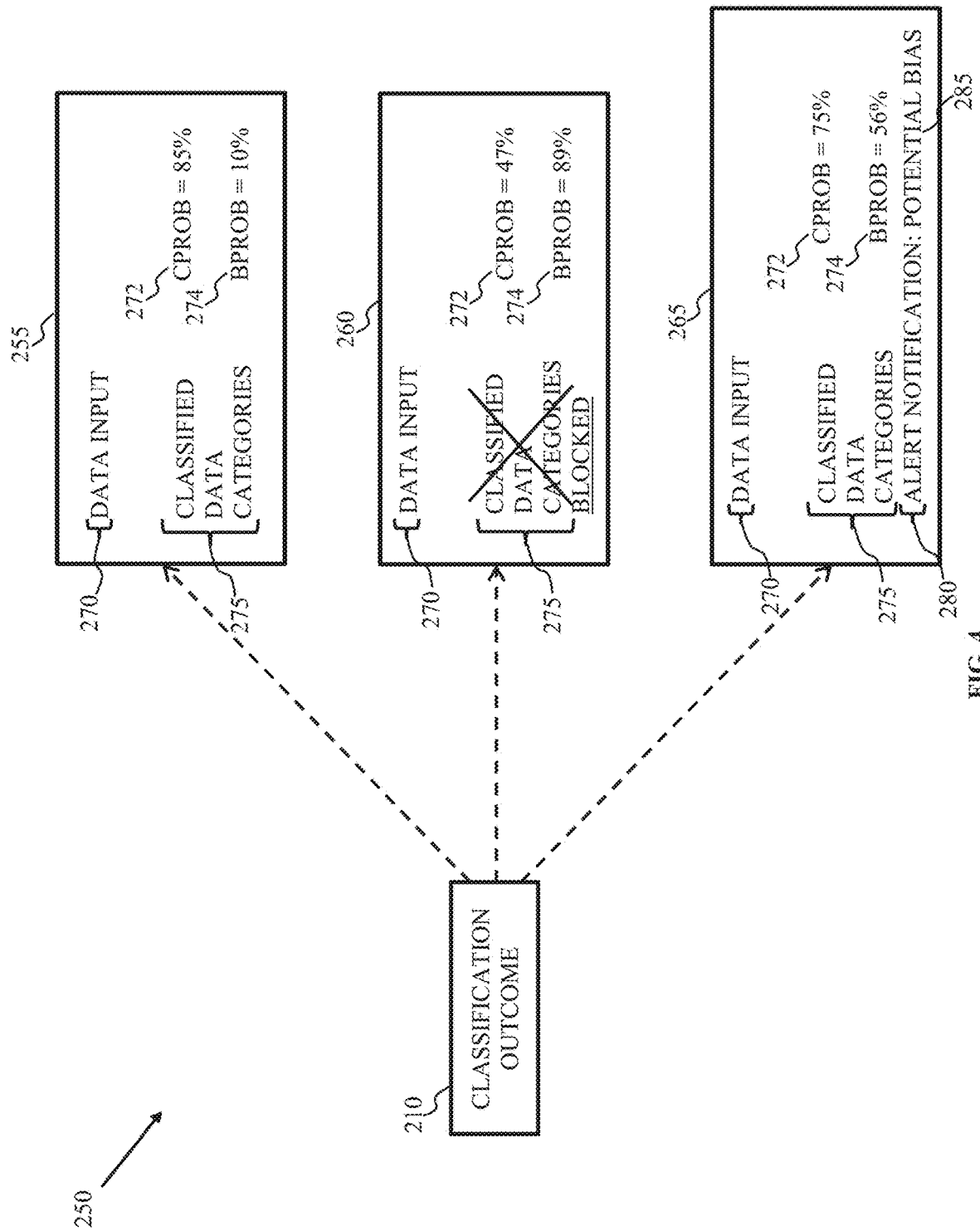
FIG. 4 depicts various classification outcomes of data inputs classified into bias categories, in accordance with one or more embodiments of the present disclosure.

FIG. 4 depicts various classification outcomes 250 of data inputs classified into bias categories, in accordance with one or more embodiments of the present disclosure. Classification outcomes 250 may be displayed on display 27 to user 30 such as on a graphic user interface (GUI). Classification outcomes 250 may include data input 270, classified data categories 275 from classification machine learning model 55, a classification confidence probability (CPROB) 272 from classification machine learning model 55, and a bias confidence probability (BPROB) 274 from bias filter machine learning model 60 for each of classified data categories 275.

In a first classification outcome 255, CPROB may be determined, for example, to be 85% indicating high confidence in classifying the data input, and BPROB may be determined to be, for example, 10% indicating a low bias probability. In this exemplary embodiment, processor 35 may cause to display the classified data categories 275 for data input 270 on display 27 to user 30.

In a second classification outcome 260, CPROB may be determined, for example, to be 47% indicating a relatively low confidence in classifying data input 270, and BPROB may be determined to be, for example, 89% indicating a very high bias probability. In this exemplary embodiment, processor 35 may block displaying classified data categories 275 for data input 270 for display to user 30 on display 27 since the probability of bias and misclassification are both high.

In a third classification outcome 265, CPROB may be determined, for example, to be 75% indicating a relatively high confidence in classifying data input 270, and BPROB may be determined to be, for example, 56% indicating a moderate bias probability. In this exemplary embodiment, processor 35 may cause to display classified data categories 275 for data input 270 on display 27 to user 30 with an alert notification 280 that there may be potential bias in the classified data categories. Note that processor 35 may apply two predefined thresholds to each of the two probabilities for assessing high confidence levels in classification outcome and similarly, high bias confidence levels in assessing high bias confidence levels in the classification outcome.

In some embodiments, processor 35 may identify the classified data input and the at least one data category as potentially biased may be used to retrain the at least one classification machine learning model.

In some embodiments, the bias filter machine learning model may be implemented as, for example, a convolutional neural network model, a dilated convolutional neural network model, a dense network, a recurrent neural network model, and/or any suitable neural network model. These models may be combined with autoencoder and/or variational autoencoder to better capture the features of samples causing bias.

In some embodiments, the classification machine learning model may be implemented a classification neural network model, for example.

In some embodiments, the gate machine learning model may be implemented as a neural network model, for example.

In some embodiments, processor 35 may receive the plurality of bias data categories from the user, from a regulator, or both. The regulators, for example, from a regulatory body may defined protected classes of data categories in the classification of the data inputs in accordance with the embodiments taught herein.

Once the bias categories and confidence level thresholds (e.g., classification and/or bias confidence level thresholds) are defined, the exemplary embodiments taught herein may be applied to any suitable classification scenario using a classifier machine learning model which may result in bias.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments, bias filter machine learning model 60 may include a set of rules (e.g., bias terms/features).

In some embodiments, feedback may be provided to bias filter machine learning model 60 where a media data input was incorrectly classified (e.g., labeled as sample(s) classified with bias).

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

Figure 5:
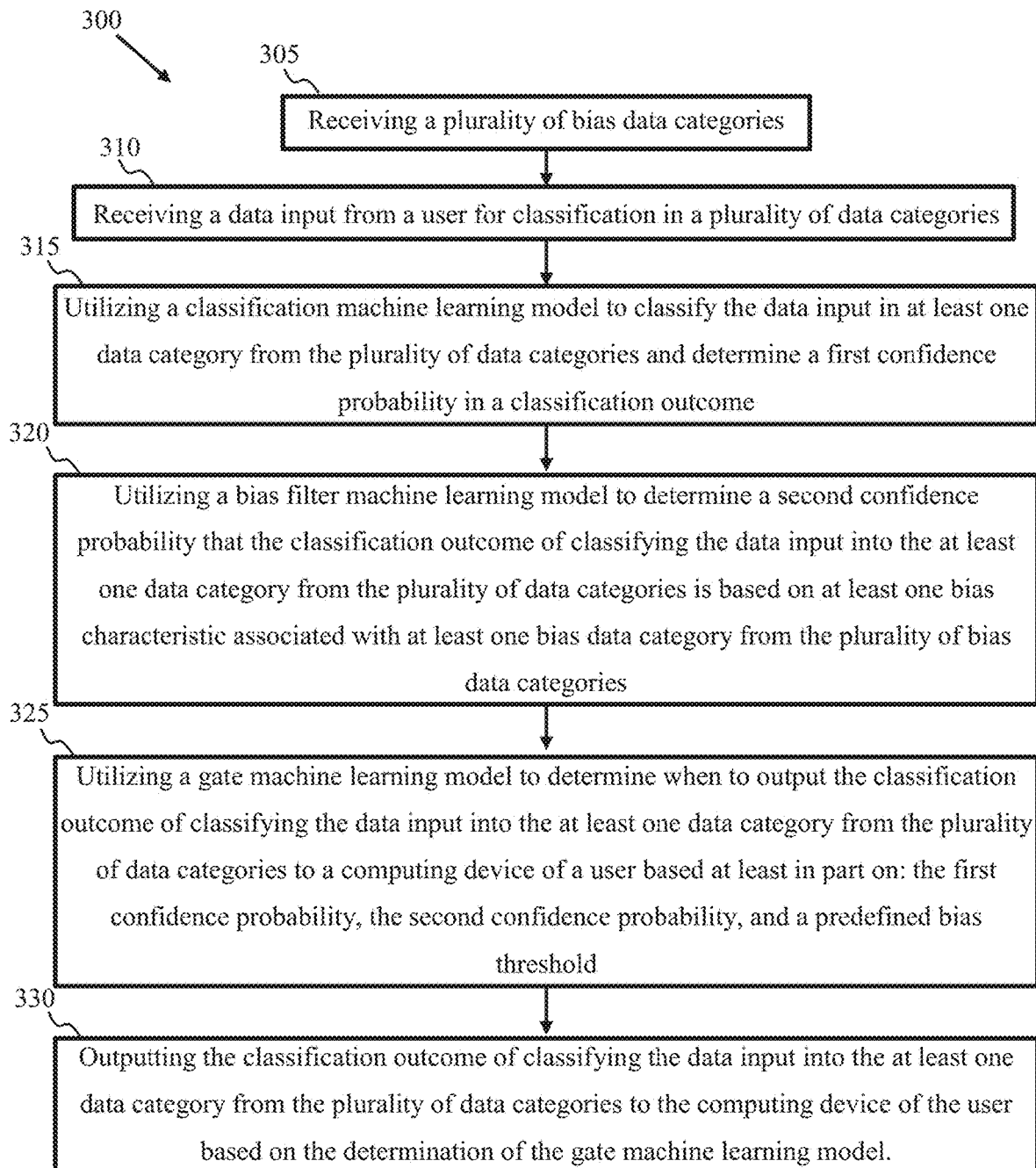
FIG. 5 illustrates a flowchart of an exemplary inventive method for managing classification outcomes of data inputs classified into bias categories, in accordance with one or more embodiments of the present disclosure.

FIG. 5 illustrates a flowchart of an exemplary inventive method for managing classification outcomes of data inputs classified into bias categories, in accordance with one or more embodiments of the present disclosure. Method 300 may be performed by processor 35.

Method 300 may include receiving 305 a plurality of bias data categories. Method 300 may include receiving 310 a data input from a user for classification in a plurality of data categories.

Method 300 may include utilizing 315 a classification machine learning model to classify the data input in at least one data category from the plurality of data categories and determine a first confidence probability in a classification outcome.

Method 300 may include utilizing 320 a bias filter machine learning model to determine a second confidence probability that the classification outcome of classifying the data input into the at least one data category from the plurality of data categories is based on at least one bias characteristic associated with at least one bias data category from the plurality of bias data categories.

Method 300 may include utilizing 325 a gate machine learning model to determine when to output the classification outcome of classifying the data input into the at least one data category from the plurality of data categories to a computing device of a user based at least in part on: the first confidence probability, the second confidence probability, and a predefined bias threshold.

Method 300 may include outputting 330 the classification outcome of classifying the data input into the at least one data category from the plurality of data categories to the computing device of the user based on the determination of the gate machine learning model.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software (e.g., C++, Objective-C, Swift, JAVA®, JAVASCRIPT®, PYTHON®, PERL®, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AMIGAOS™, AMIGAOS4™; (2) FreeBSD, NetBSD, OpenBSD; (3) LINUX®; (4) MICROSOFT WINDOWS®; (5) OpenVMS; (6) OS X (Mac OS); (7) OS/2; (8) SOLARIS®; (9) Tru64 UNIX; (10) VM; (11) ANDROID®; (12) Bada; (13) BLACKBERRY® OS; (14) FIREFOX® OS; (15) iOS; (16) Embedded LINUX®; (17) Palm OS; (18) Symbian; (19) TIZEN®; (20) WebOS; (21) Windows Mobile; (22) Windows Phone; (23) ADOBE® AIR; (24) ADOBE® Flash; (25) ADOBE® Shockwave; (26) Binary Runtime Environment for Wireless (BREW); (27) Cocoa (API); (28) Cocoa Touch; (29) JAVA® Platforms; (30) JavaFX; (31) JavaFX Mobile; (32) Microsoft XNA; (33) Mono; (34) MOZILLA® Prism, XUL and XULRunner; (35) .NET Framework; (36) SILVERLIGHT®; (37) Open Web Platform; (38) ORACLE® Database; (39) Qt; (40) SAP NETWEAVER®; (41) Smartface; (42) Vexi; and (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

Figure 6:
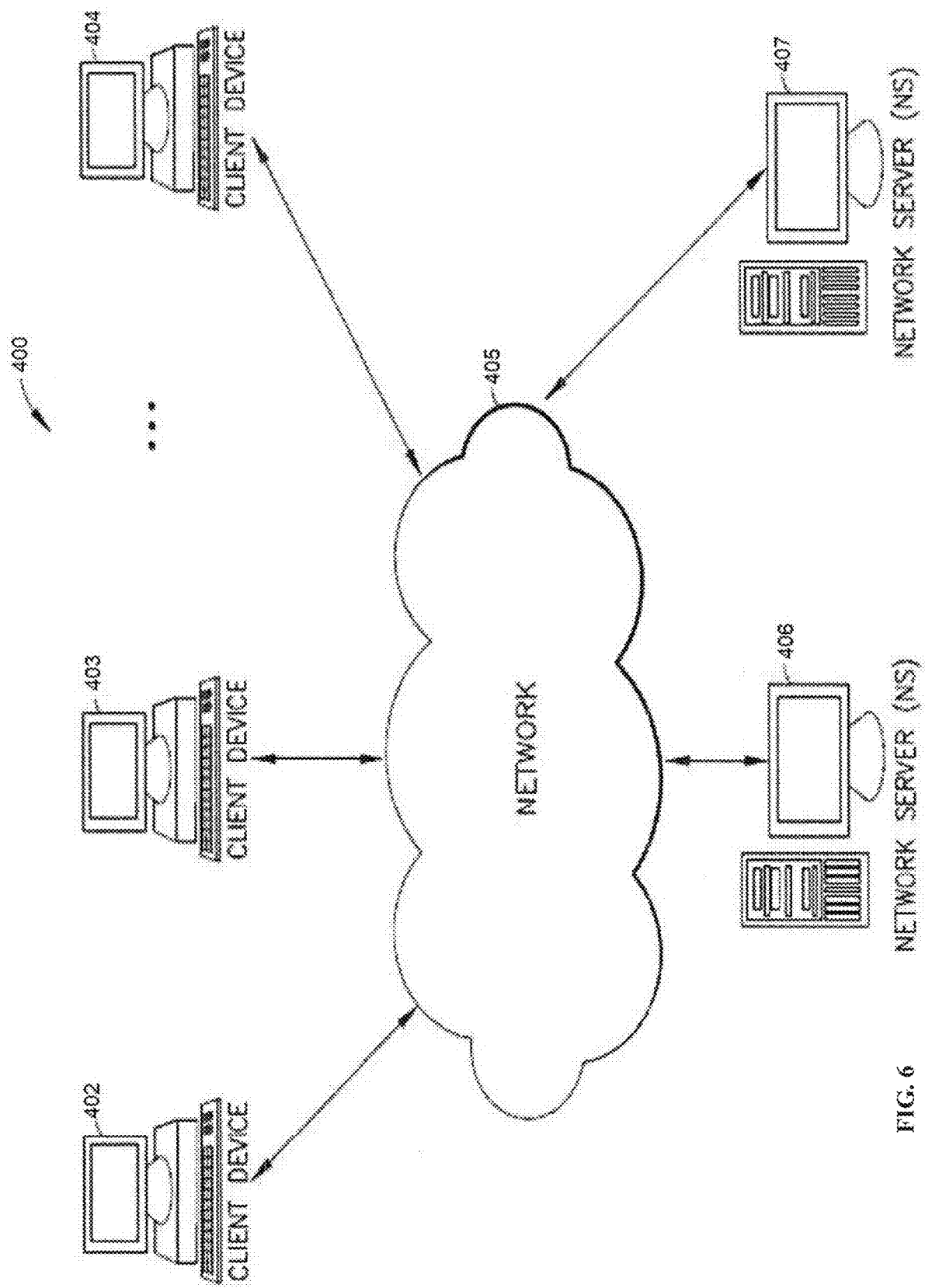
FIG. 6 depicts a block diagram of an exemplary computer-based system/platform in accordance with one or more embodiments of the present disclosure.

FIG. 6 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage a large number of members and/or concurrent transactions, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 6, members 402-404 (e.g., clients) of the exemplary computer-based system/platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WIFI®, WIMAX®, CDMA, satellite, ZIGBEE®, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either JAVA®, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZIGBEE®, 3G, 4G, 5G, GSM, GPRS, WIFI®, WIMAX®, CDMA, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 6, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, JABBER®, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 7:
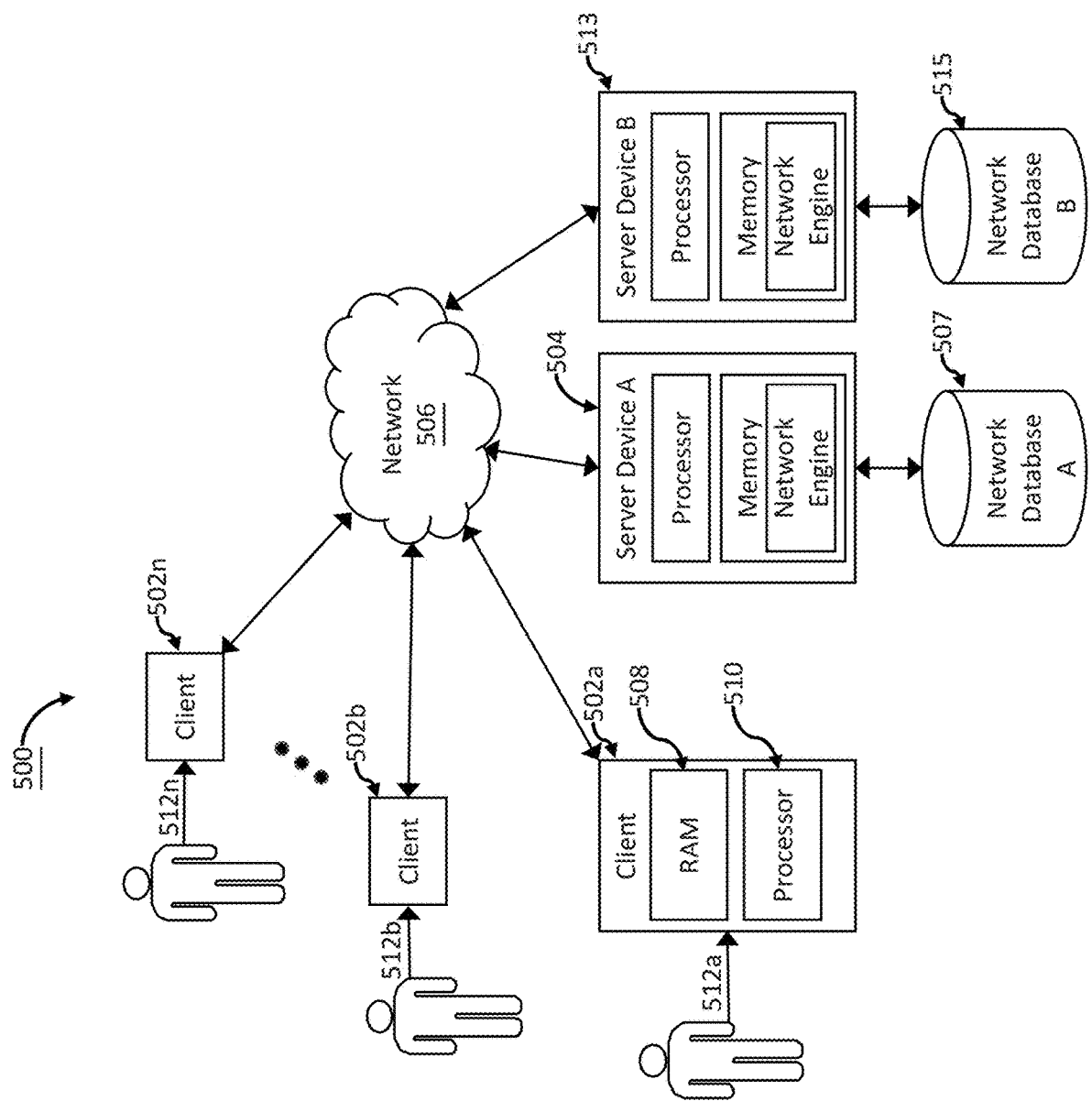
FIG. 7 depicts a block diagram of another exemplary computer-based system/platform accordance with one or more embodiments of the present disclosure.

FIG. 7 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, JAVA®, PYTHON®, PERL®, JAVASCRIPT®, and etc.

In some embodiments, member computing devices 502*a* through 502*n* may also comprise a number of external or internal devices such as a mouse, a CD-ROM, DVD, a physical or virtual keyboard, a display, a speaker, or other input or output devices. In some embodiments, examples of member computing devices 502*a* through 502*n* (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502*a* through 502*n* may be specifically programmed with one or more application programs in accordance with one or more principles/methodologies detailed herein. In some embodiments, member computing devices 502*a* through 502*n* may operate on any operating system capable of supporting a browser or browser-enabled application, such as Microsoft™ Windows™, and/or Linux. In some embodiments, member computing devices 502*a* through 502*n* shown may include, for example, personal computers executing a browser application program such as Microsoft Corporation's INTERNET EXPLORER®, Apple Computer, Inc.'s SAFARI®, MOZILLA FIREFOX®, and/or Opera. In some embodiments, through the member computing client devices 502*a* through 502*n*, users, 512*a* through 512*n*, may communicate over the exemplary network 506 with each other and/or with other systems and/or devices coupled to the network 506. As shown in FIG. 10, exemplary server devices 504 and 513 may be also coupled to the network 506. In some embodiments, one or more member computing devices 502*a* through 502*n* may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FILE-MAKER®, Microsoft Access, Microsoft SQL Server, MYSQL®, POSTGRESQL®, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable data organization that may result in one or more applicable data structures that may include fields, records, files, and/or objects. In some embodiments, the exemplary DBMS-managed database may be specifically programmed to include metadata about the data that is stored.

Figure 8:
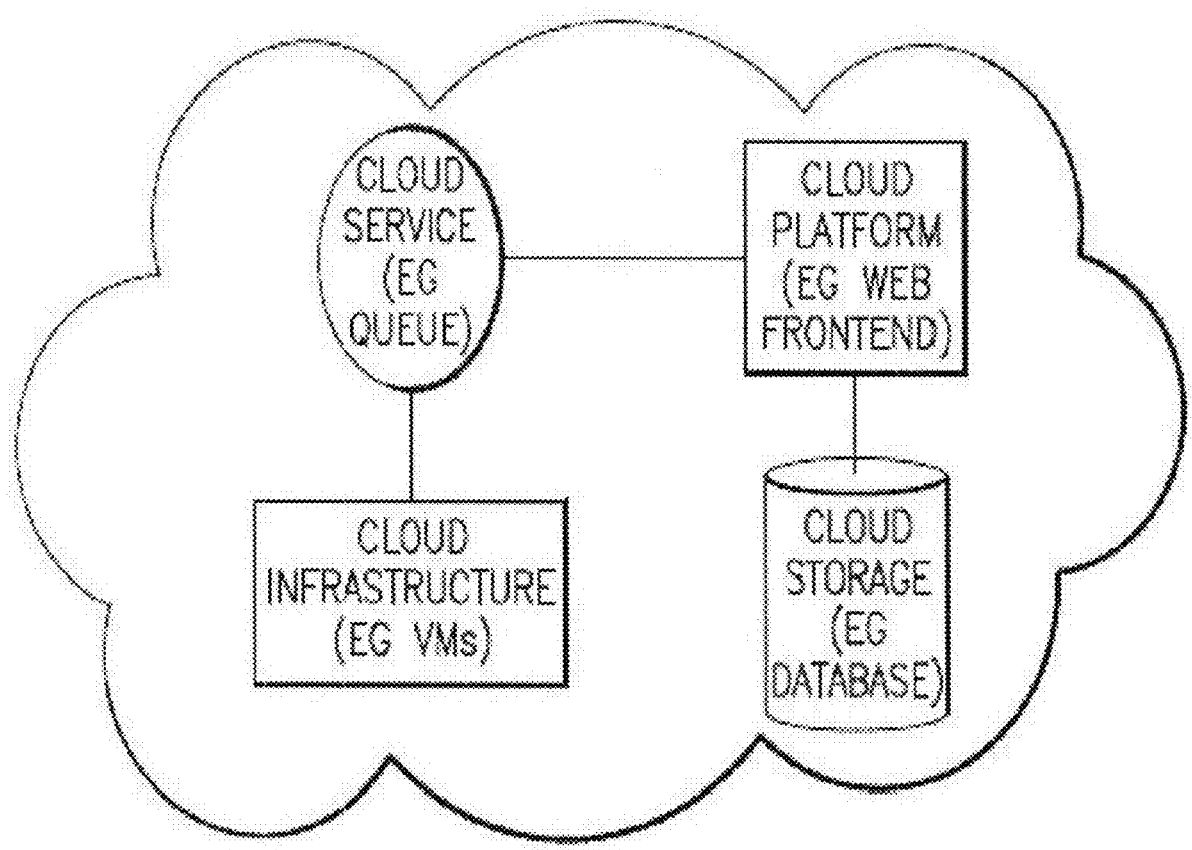
FIGS. 8 and 9 are diagrams illustrating implementations of cloud computing architecture/aspects with respect to which the disclosed technology may be specifically configured to operate, in accordance with one or more embodiments of the present disclosure.
Figure 9:
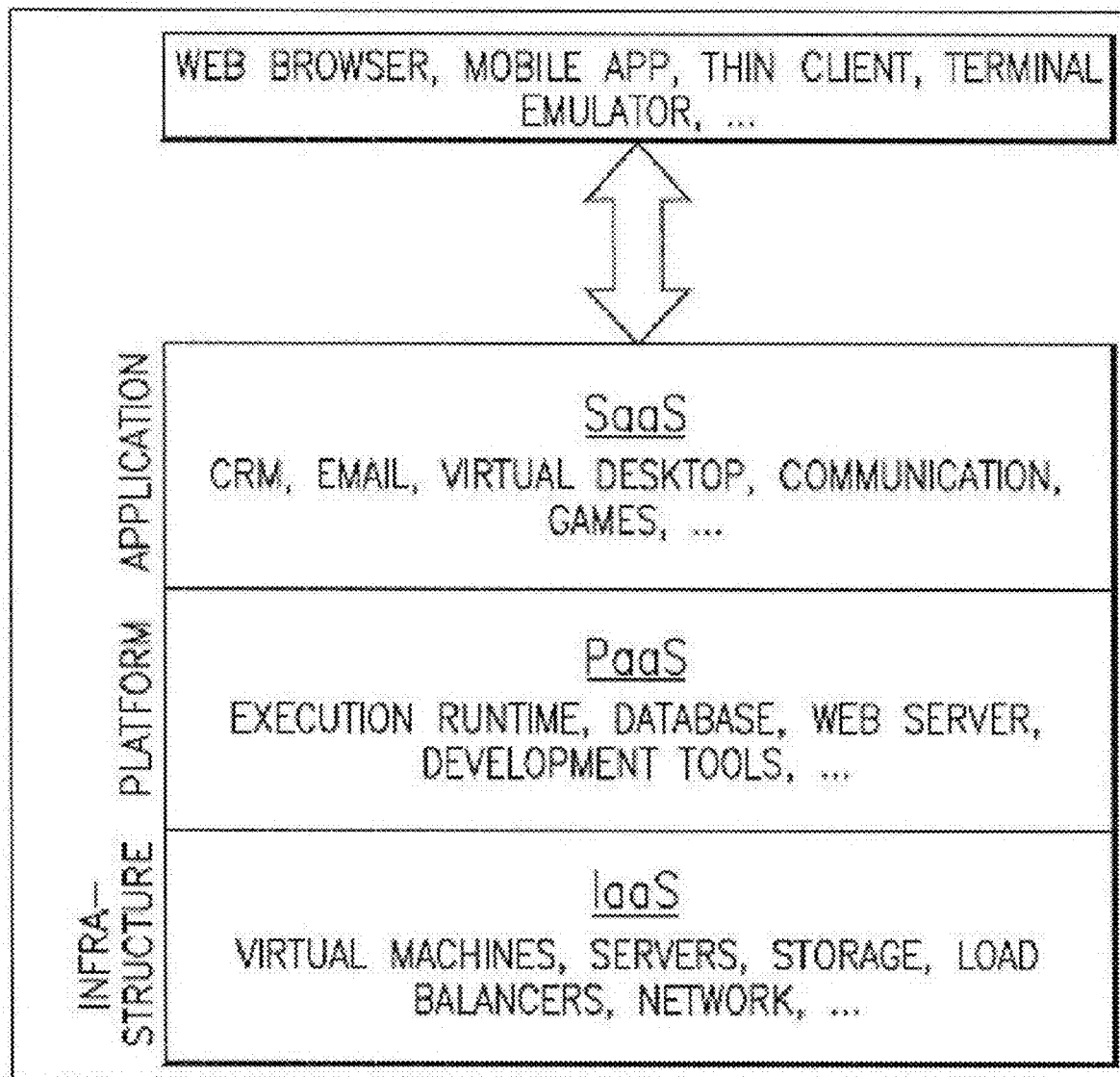

In some embodiments, the exemplary inventive computer-based systems/platforms, the exemplary inventive computer-based devices, and/or the exemplary inventive computer-based components of the present disclosure may be specifically configured to operate in an cloud computing/architecture such as, but not limiting to: infrastructure a service (IaaS), platform as a service (PaaS), and/or software as a service (SaaS). FIGS. 8 and 9 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

In some embodiments, a method may include:

receiving, by a processor, a plurality of bias data categories;

receiving, by the processor, a data input from a user for classification in a plurality of data categories;

utilizing, by the processor, a classification machine learning model to classify the data input in at least one data category from the plurality of data categories and determine a first confidence probability in a classification outcome;

utilizing, by the processor, a bias filter machine learning model to determine a second confidence probability that the classification outcome of classifying the data input into the at least one data category from the plurality of data categories is based on at least one bias characteristic associated with at least one bias data category from the plurality of bias data categories;

utilizing, by the processor, a gate machine learning model to determine when to output the classification outcome of classifying the data input into the at least one data category from the plurality of data categories to a computing device of a user based at least in part on:

i) the first confidence probability, ii) the second confidence probability, and iii) a predefined bias threshold; and outputting, by the processor, the classification outcome of classifying the data input into the at least one data category from the plurality of data categories to the computing device of the user based on the determination of the gate machine learning model.

In some embodiments, outputting the classification outcome of classifying the data input into the at least one data category from the plurality of data categories may include outputting the at least one data category to the computing device of the user when the gate machine learning model assesses that the second confidence probability is below the predefined bias threshold.

In some embodiments, outputting the classification outcome of classifying the data input into the at least one data category from the plurality of data categories may include blocking an output to the user of the at least one data category of the classified data input when the gate machine learning model assesses that the second confidence probability is above the predefined bias threshold.

In some embodiments, utilizing the gate machine learning model to determine when to output the classification outcome may include identifying a potential bias in classifying the data input when the gate machine learning model assesses the first probability is below a classification confidence threshold and the second probability is above the predefined bias threshold.

In some embodiments, outputting the classification outcome may include outputting to the user, the at least one data category from classifying the data input and a notification that the at least one data category is potentially biased.

In some embodiments, the method may further include using, by the processor, the classified data input and the at least one data category identified as potentially biased to retrain the at least one classification machine learning model.

In some embodiments, the data input may be selected from the group consisting of an image file, a text file, a video file, and an audio file.

In some embodiments, the bias filter machine learning model may be selected from the group consisting of a convolutional neural network model, a dilated convolutional neural network model, and a recurrent neural network model.

In some embodiments, the classification machine learning model may include a classification neural network model.

In some embodiments, receiving the plurality of bias data categories may include receiving the plurality of bias data categories from the user. from a regulator, or both.

In some embodiments, a system may include a memory and a processor. The processor may be configured to:
  receive a plurality of bias data categories;
  receive a data input from a user for classification in a plurality of data categories;
  utilize a classification machine learning model to classify the data input in at least one data category from the plurality of data categories and determine a first confidence probability in a classification outcome;
  utilize a bias filter machine learning model to determine a second confidence probability that the classification outcome of classifying the data input into the at least one data category from the plurality of data categories is based on at least one bias characteristic associated with at least one bias data category from the plurality of bias data categories;
  utilize a gate machine learning model to determine when to output the classification outcome of classifying the data input into the at least one data category from the plurality of data categories to a computing device of a user based at least in part on:
  i) the first confidence probability,
  ii) the second confidence probability, and
  iii) a predefined bias threshold; and
  output the classification outcome of classifying the data input into the at least one data category from the plurality of data categories to the computing device of the user based on the determination of the gate machine learning model.

In some embodiments, the processor may be configured to output the classification outcome of classifying the data input into the at least one data category from the plurality of data categories by outputting the at least one data category to the computing device of the user when the gate machine learning model assesses that the second confidence probability is below the predefined bias threshold.

In some embodiments, the processor may be configured to output the classification outcome of classifying the data input into the at least one data category from the plurality of data categories by blocking an output to the user of the at least one data category of the classified data input when the gate machine learning model assesses that the second confidence probability is above the predefined bias threshold.

In some embodiments, the processor may be configured to utilize the gate machine learning model to determine when to output the classification outcome by identifying a potential bias in classifying the data input when the gate machine learning model assesses the first probability is below a classification confidence threshold and the second probability is above the predefined bias threshold.

In some embodiments, the processor may be configured to output the classification outcome by outputting to the user, the at least one data category from classifying the data input and a notification that the at least one data category is potentially biased.

In some embodiments, the processor may be further configured to use the classified data input and the at least one data category identified as potentially biased to retrain the at least one classification machine learning model.

In some embodiments, the data input may be selected from the group consisting of an image file, a text file, a video file, and an audio file.

In some embodiments, the bias filter machine learning model may be selected from the group consisting of a convolutional neural network model, a dilated convolutional neural network model, and a recurrent neural network model.

In some embodiments, the classification machine learning model may include a classification neural network model.

In some embodiments, the processor may be configured to receive the plurality of bias data categories by receiving the plurality of bias data categories from the user. from a regulator, or both.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A method, comprising:
  receiving concurrently into a parallel configuration of a classification machine learning model and a bias filter machine learning model a data input for classification into at least one data category of a plurality of data categories;
    wherein the data input comprises initial data and the plurality of data categories;
  generating concurrently a classification output by the classification machine learning model and a bias confidence probability output by the bias filter machine learning model;
  inputting the classification output and the bias confidence probability output into a gate machine learning model;
  wherein the classification output comprises:
    a classification of the initial data in the at least one data category from the plurality of data categories to form a classified data, and
    a classification confidence probability in the classification of the initial data in the classified data;

wherein the bias confidence probability output comprises a bias confidence probability that the classification of the initial data in the classified data is related to at least one bias characteristic;

training incrementally the classification, bias filter, and gate machine learning models in an iterative manner with feedback using the data input, the classification output, and the bias confidence probability output;

generating a classification outcome of the classified data by the gate machine learning model based on the classification output and the bias confidence probability output;

wherein the classification outcome is one of a category of:
i) biased
ii) potentially biased, or
iii) unbiased;

retraining, for each of the at least one bias characteristic wherein the classification outcome is biased or potentially biased, for at least one subsequent iteration of the incremental iterative training with feedback of the classification, bias filter, and gate machine learning models to update the classification, bias filter, and gate machine learning models until the bias confidence probability is below a predefined bias threshold by blocking the classified data that is biased and adding into the data input at least:
i) the classification output and
ii) the bias confidence probability output; and outputting the classification outcome of the classified data to a computing device associated with a user when the classification outcome of the classified data is unbiased or potentially biased and blocking an output of the classified data when it is determined by the classification, bias filter, and gate machine learning models that the classification outcome of the classified data is biased.

2. The method according to claim 1, wherein the outputting comprises displaying a blocking alert that the classified data is biased, or an indication of potential bias on a display of the computing device associated with the user.

3. The method according to claim 1, wherein the data input is selected from the group consisting of an image file, a text file, a video file, and an audio file.

4. The method according to claim 1, wherein the bias filter machine learning model is selected from the group consisting of a convolutional neural network model, a dilated convolutional neural network model, an autoencoder, a variational autoencoder, and a recurrent neural network model.

5. The method according to claim 1, further comprising providing feedback to the bias filter machine learning model when the data input is misclassified.

6. The method according to claim 1, wherein the bias filter machine learning model comprises one or more bias characteristics.

7. The method according to claim 1, wherein the at least one bias characteristic is selected from the group consisting of gender, race, skin color, shape of body part, mental abilities, physical abilities, place of origin, social affiliation, political affiliation, and education level.

8. A system, comprising:
a memory; and
a processor configured to:
receive concurrently into a parallel configuration of a classification machine learning model and a bias filter machine learning model a data input for classification into at least one data category of a plurality of data categories;
wherein the data input comprises initial data and the plurality of data categories;

generate concurrently a classification output by the classification machine learning model and a bias confidence probability output by the bias filter machine learning model;

input the classification output and the bias confidence probability output into a gate machine learning model;

wherein the classification output comprises:
a classification of the initial data input in the at least one data category from the plurality of data categories to form a classified data, and
a classification confidence probability in the classification of the initial data in the classified data;
wherein the bias confidence probability output comprises a bias confidence probability that the classification of the initial data in the classified data is related to at least one bias characteristic;

train incrementally the classification, bias filter, and gate machine learning models in an iterative manner with feedback using the data input, the classification output, and the bias confidence probability output;

generate a classification outcome of the classified data by the gate machine learning model based on the classification output and the bias confidence probability output;

wherein the classification outcome is one of a category of:
i) biased
ii) potentially biased, or
iii) unbiased;

retrain, for each of the at least one bias characteristic wherein the classification outcome is biased or potentially biased, for at least one subsequent iteration of the incremental iterative training with feedback of the classification, bias filter, and gate machine learning models to update the classification, bias filter, and gate machine learning models until the bias confidence probability is below a predefined bias threshold by blocking the classified data that is biased and adding into the data input at least:
i) the classification output and
ii) the bias confidence probability output; and output the classification outcome of the classified data to a computing device associated with a user when the classification outcome of the classified data is unbiased or potentially biased and blocking an output of the classified data when it is determined by the classification, bias filter, and gate machine learning models that the classification outcome of the classified data is biased.

9. The system according to claim 8, further comprising a display, and wherein the processor is configured to output, a blocking alert that the classified data is biased, or an indication of potential bias on the display of the computing device associated with the user.

10. The system according to claim 8, wherein the data input is selected from the group consisting of an image file, a text file, a video file, and an audio file.

11. The system according to claim 8, wherein the bias filter machine learning model is selected from the group consisting of a convolutional neural network model, a dilated convolutional neural network model, an autoencoder, a variational autoencoder, and a recurrent neural network model.

12. The system according to claim 8, wherein the processor is further configured to provide feedback to the bias filter machine learning model when the data input is misclassified.

13. The system according to claim 8, wherein the bias filter machine learning model comprises one or more bias characteristics.

14. The system according to claim 8, wherein the at least one bias characteristic is selected from the group consisting of gender, race, skin color, shape of body part, mental abilities, physical abilities, place of origin, social affiliation, political affiliation, and education level.

15. The method according to claim 1, wherein the classification machine learning model is a classification neural network model.

16. The method according to claim 1, wherein the gate machine learning model is a neural network model.

17. The method according to claim 1, wherein the at least one bias characteristic is associated with at least one bias data category from a plurality of bias data categories; and
further comprising receiving the plurality of bias data categories from the user, at least one regulator, at least one regulatory body, or any combination thereof.

18. The system according to claim 8, wherein the classification machine learning model is a classification neural network model.

19. The system according to claim 8, wherein the gate machine learning model is a neural network model.

20. The system according to claim 11, wherein the at least one bias characteristic is associated with at least one bias data category from a plurality of bias data categories; and
wherein the processor is further configured to receive the plurality of bias data categories from the user, at least one regulator, at least one regulatory body, or any combination thereof.

* * * * *